United States Patent
Kumar et al.

(10) Patent No.: US 12,307,426 B2
(45) Date of Patent: May 20, 2025

(54) INTERNATIONAL REMITTANCES VIA INTRABANK TRANSFERS

(71) Applicant: Wells Fargo Bank, N.A., San Francisco, CA (US)

(72) Inventors: Atiraj Kumar, Hyderabad (IN); Gaurav Wadhwa, Maharashtra (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/233,436

(22) Filed: Aug. 14, 2023

(65) Prior Publication Data

US 2023/0385789 A1 Nov. 30, 2023

Related U.S. Application Data

(63) Continuation of application No. 17/565,378, filed on Dec. 29, 2021, now Pat. No. 11,727,369, which is a continuation of application No. 16/049,066, filed on Jul. 30, 2018, now Pat. No. 11,257,052.

(51) Int. Cl.
G06Q 20/10 (2012.01)

(52) U.S. Cl.
CPC .................. G06Q 20/10 (2013.01)

(58) Field of Classification Search
None
See application file for complete search history.

(56) References Cited

U.S. PATENT DOCUMENTS

| | | | |
|---|---|---|---|
| 6,721,715 B2 | 4/2004 | Nemzow | |
| 7,516,100 B1 * | 4/2009 | Anuszewski | G06Q 40/02 705/35 |
| 7,523,054 B2 | 4/2009 | Tyson-Quah | |
| 7,540,408 B2 * | 6/2009 | Levine | G06Q 40/00 235/379 |
| 7,996,309 B2 | 8/2011 | Avazian et al. | |
| 8,156,044 B2 * | 4/2012 | Johnson | G06Q 40/02 705/35 |
| 8,538,871 B2 | 9/2013 | Portillo et al. | |
| 8,676,681 B2 | 3/2014 | Chan et al. | |
| 8,712,887 B2 | 4/2014 | Degroeve et al. | |
| 8,875,990 B2 | 11/2014 | Bishop et al. | |
| 10,489,755 B2 * | 11/2019 | Tikku | G06Q 20/227 |
| 2003/0046224 A1 | 3/2003 | Mujtaba et al. | |
| 2003/0233333 A1 * | 12/2003 | Lee | G06Q 30/02 705/75 |
| 2007/0090183 A1 * | 4/2007 | Hursta | G06Q 20/28 705/37 |
| 2010/0211495 A1 | 8/2010 | Zanzot et al. | |

(Continued)

*Primary Examiner* — Paul S Schwarzenberg
(74) *Attorney, Agent, or Firm* — Foley & Lardner LLP

(57) ABSTRACT

Aspects for international remittances are disclosed herein. A sender initiates a request to remit funds to a recipient. The sender has an account with a first financial institution and the recipient has an account with a second financial institution. The request is communicated to specific bidders that have accounts with both the first and second financial institutions. The bidders submit bids for satisfying a request. When a bid is selected, funds are transferred from the sender's account with the first institution to the bidder's account with the first institution, and from the bidder's account with the second institution to the recipient's account with the second institution.

18 Claims, 8 Drawing Sheets

(56) References Cited

U.S. PATENT DOCUMENTS

| | | | |
|---|---|---|---|
| 2011/0106638 A1* | 5/2011 | Fernandez | G06Q 20/204 705/17 |
| 2011/0106695 A1* | 5/2011 | Fernandez | G06Q 20/10 235/380 |
| 2011/0131128 A1 | 6/2011 | Vaananen | |
| 2011/0206638 A1 | 8/2011 | Choi | |
| 2011/0238553 A1 | 9/2011 | Raj et al. | |
| 2015/0142643 A1 | 5/2015 | Ceribelli et al. | |
| 2015/0294297 A1 | 10/2015 | Lipshultz | |
| 2015/0302370 A1* | 10/2015 | Hammock | G06Q 20/10 705/44 |
| 2020/0175496 A1* | 6/2020 | Finke | G06Q 20/3274 |

* cited by examiner

INTERNATIONAL REMITTANCES VIA INTRABANK TRANSFERS

CROSS-REFERENCE TO RELATED PATENT APPLICATIONS

This application is a continuation of U.S. patent application Ser. No. 17/565,378, filed Dec. 29, 2021, and granted as U.S. Pat. No. 11,727,369, which is a continuation of U.S. patent application Ser. No. 16/049,066, filed Jul. 30, 2018, and granted as U.S. Pat. No. 11,257,052, the contents of each of which are hereby incorporated by reference in their entirety and for all purposes.

BACKGROUND

The present disclosure relates generally to the field of remittances and, more specifically, to international remittances.

As the global economy expands, more entities (e.g., individuals, companies, etc.) may find the need to transfer funds overseas to a destination country. Such transfers typically entail a high fee to the sender. Generally speaking, the high fees associated with these international remittances are driven by a series of transfers through several different correspondent institutions, each of which may receive some fee for executing a transfer. As a result, a sender incurs significant fees for such transfers.

In some instances, the sender may have an account with a financial institution which owns or controls an account with a financial institution in the destination country (e.g., a NOSTRO account). In such instances, these financial institutions would need to maintain cash reserves in their NOSTRO account, which may be a financial burden to those financial institutions. As a result, these institutions may charge fees for transferring funds using these NOSTRO accounts. Furthermore, such transfers may be limited through government or international regulation. For instance, such transfers may be limited in amount, number of transfers per month (or year), etc.

Where the sender does not have an account with a financial institution having a NOSTRO account in the destination country, a correspondent bank acts as an intermediary between the sending and receiving financial institutions. In some instances, multiple correspondent banks must be used. Such transactions typically incur significant fees due to several institutional transfers, each of which may have a fee associated therewith. Furthermore, such arrangements may exhibit significant delays.

International transfers can also be facilitated using third-party international money transfer vendors, such as Western Union, Money Gram, Xoom, etc. Such transfers typically include high fees because the vendors must pre-fund the transfers and must maintain a physical presence at both ends. Further, such transfers can also exhibit significant delays because they typically are bundled together such that many individual transfers are consolidated to one large transfer (e.g., net settlement).

SUMMARY

According to one aspect of the disclosure, a system for international remittances using intrabank transfers is described. The system includes a communications device communicably coupled to a user device. The communications device receives data from the user device based on information provided by a first user to the user device. The system includes a processing circuit. The processing circuit includes a processor and memory. The memory is structured to store instructions that, when executed by the processor, cause the processor to receive, via the communications device, a request from the user device to remit funds from a first account associated with the first user to a second account associated with a second user. The first account is held with a first institution and the second account is held with a second institution. The memory is further structured to store instructions to identify a third user having a third account held with the first financial institution and a fourth account held with the second financial institution. Identifying the third user includes accessing, using a first API communicably coupled to the first financial institution, first data corresponding to a plurality of users having a respective account with the first financial institution, accessing, using a second API communicably coupled to the second financial institution, second data corresponding to a plurality of users having a respective account with the second financial institution, and executing an executable rule, based at least in part on the request received from the user device, to the first data and the second data to identify the third user. The memory is further structured to initiate a first intrabank transfer to transfer funds from the first account to the third account of the third user and initiate a second intrabank transfer to transfer funds from the fourth account to the second account.

According to another aspect of the disclosure, a method of using intrabank transfers for an international remittance is described. The method includes receiving, via a communications device, a request from a user to remit funds from a first account associated with a first user to a second account associated with a second user, the first account being with a first institution and the second account being with a second institution. The method further includes identifying a third user having a third account held with the first financial institution and a fourth account held with the second financial institution. Identifying the third user includes accessing, using a first API communicably coupled to the first financial institution, first data corresponding to a plurality of users having a respective account with the first financial institution, accessing, using a second API communicably coupled to the second financial institution, second data corresponding to a plurality of users having a respective account with the second financial institution, and executing an executable rule, based at least in part on the request received from the user device, to the first data and the second data to identify the third user. The method further includes initiating a first intrabank transfer to transfer funds from the first account to the third account of the third user and initiating a second intrabank transfer to transfer funds from the fourth account to the second account.

According to another aspect of the disclosure, a non-transient computer-readable storage medium includes instructions embodied thereon, where the instructions are executable by one or more processors to perform a method for pre-approving onboarding to a payment platform, executing on a processing device. The method includes receiving, via a communications device, a request from a user to remit funds from a first account associated with a first user to a second account associated with a second user, the first account being with a first institution and the second account being with a second institution. The method further includes identifying a third user having a third account held with the first financial institution and a fourth account held with the second financial institution. Identifying the third user includes accessing, using a first API communicably coupled to the first financial institution, first data corresponding to a plurality of users having a respective account with the first financial institution, accessing, using a second API communicably coupled to the second financial institution, second data corresponding to a plurality of users having a respective account with the second financial institution, and executing an executable rule, based at least in part on the request received from the user device, to the first data and the second data to identify the third user. The method further includes initiating a first intrabank transfer to transfer funds from the first account to the third account of the third user and initiating a second intrabank transfer to transfer funds from the fourth account to the second account.

DETAILED DESCRIPTION

Figure 1:
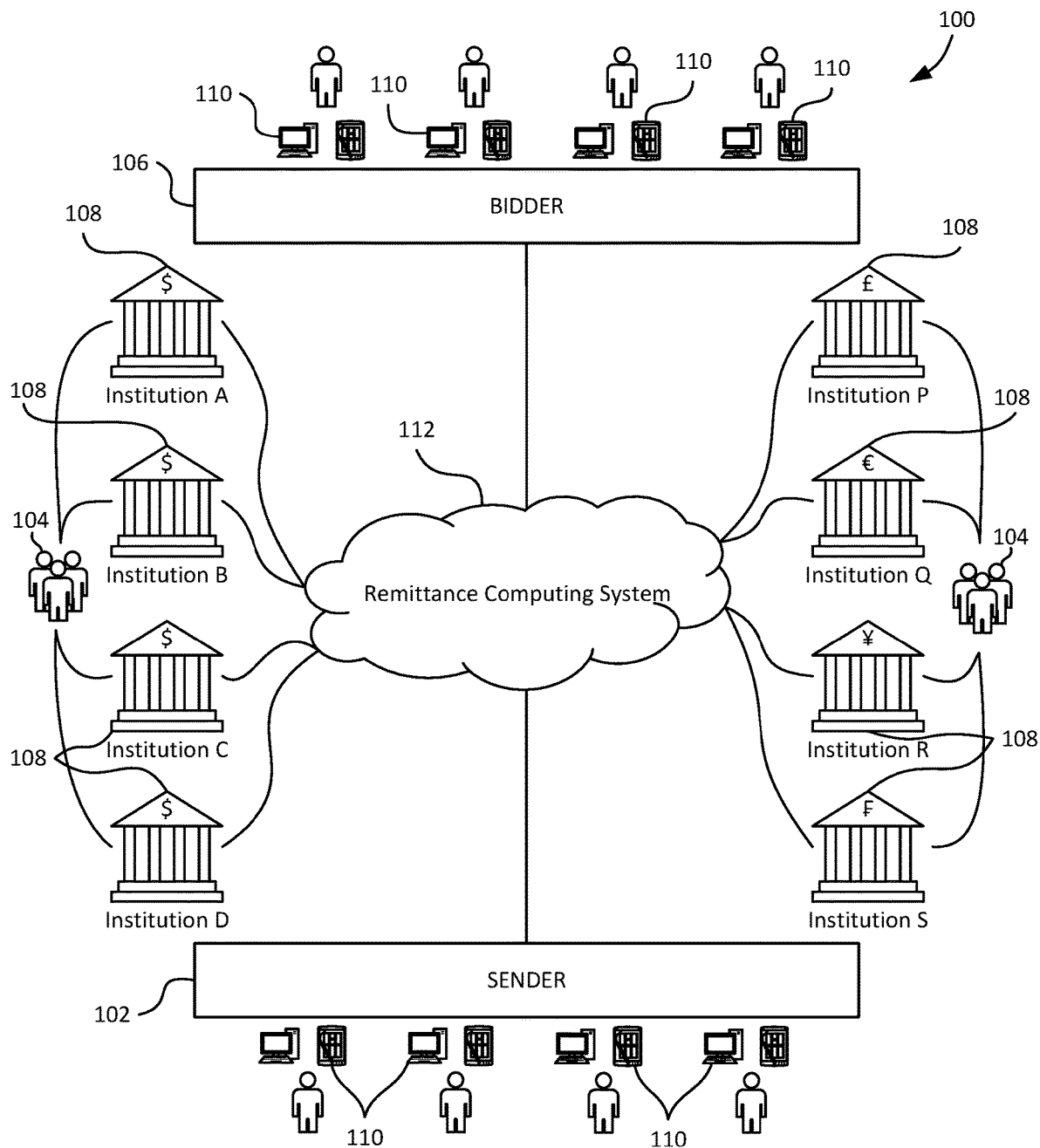
FIG. 1 shows a system for international remittances, according to an exemplary embodiment.

Referring generally to the FIGURES, systems and methods for international remittances using intrabank transfers is described. A sender initiates a request to remit funds to a recipient. The sender has an account with a first financial institution and the recipient has an account with a second financial institution. The request is communicated to specific bidders that have accounts with both the first and second financial institutions. The bidders submit bids for satisfying the request. When a bid is selected, funds are transferred from the sender's account with the first institution to the bidder's account with the first institution, and from the bidder's account with the second institution to the recipient's account with the second institution.

The arrangements described herein facilitate international remittances via a consumer network-based (consumer-to-consumer) international remittance system. As opposed to existing international remittances that involve a single international money transfer between a sender and a receiver via a correspondent banking network or a third-party international money transfer service, the arrangements described herein facilitate international remittances via two domestic intrabank money transfers: one transfer is between the sender's and the bidder's accounts at the sender's financial institution and the other transfer is between the bidder's and the receiver's accounts at the receiver's financial institution. The bidder charges a fee for facilitating these transactions, which is typically lower than the international transfer fee that financial institutions charge for international remittances.

The arrangements described herein provide various technical solutions to problems and shortcomings of existing international remittance systems. For example, the arrangements described herein may decrease cost for international remittance and expedite international remittances. Specifically, senders may benefit from decreased transfer fees by satisfying the request through the bidding process, rather than incurring transfer fees from, for instance, an automated clearing house, a wire transfer, or a third-party vendor. Additionally, international remittances may become instantaneous or near instantaneous. As a result of satisfying an international remittance via a series of intrabank transfers, those intrabank transfers can occur in real-time or near real-time. Where typical international remittances may take a number of days to clear where the funds are accessible, intrabank transfers occur in near-real time since those financial institutions have immediate access to the corresponding account information. Additionally, intrabank transfers typically do not incur any fees, whereas interbank transfers typically incur fees. Such fees may be avoided by using the disclosed systems and methods.

Furthermore, the arrangements described herein eliminate the need for NOSTRO and VOSTRO accounts because users will be able to remit funds internationally without the users' financial institutions having an account in the destination country. In instances where users have an account with an institution that has a NOSTRO account (or other account in the destination country), such users benefit from the aspects described herein by reduced costs for funding such accounts.

According to the aspects described herein, users who send funds internationally can benefit from expedited transfers and reduced fees. Various other benefits of the disclosed systems and methods may become apparent according to the following disclosure.

Referring now to FIG. 1, a system 100 for international remittances is shown, according to an exemplary embodiment. The system 100 includes senders 102, recipients 104, and bidders 106 (collectively referred to herein as "users"). For any given remittance, any user may be a sender 102, recipient 104, or bidder 106. In some instances, for some remittances, a user may be both a sender 102 and a recipient 104. These users may be any type of entity including, for instance, a business, a group of individuals, a single individual, etc. As will be described in further detail below, a sender 102 initiates a request to remit funds to a recipient 104. The request is communicated to specific bidders 106 who are eligible to bid on the request. The sender 102 selects a bid from a bidder 106, and funds are transferred through a series of intrabank transfers from the sender 102 to the bidder 106 and from the bidder 106 to the recipient 104.

The system is shown to include a plurality of financial institutions 108. Each of the financial institutions 108 may maintain accounts with funds that are denominated in a currency. For instance, some of the financial institutions 108 may maintain accounts that are denominated in one currency (such as USD) while other financial institutions 108 may maintain accounts that are denominated in different currencies (such as GBP, EUR, Yen, Fr, etc.).

Each user may have at least one account with a particular financial institution 108. In some embodiments, some users may have two or more accounts with two different financial institutions 108. For instance, some users may have an account with financial institution A, which is shown to be denominated in USD, and an account with financial institution Q, which is shown to be denominated in EUR. Additionally, some users may have an account with financial institution P and financial institution R, which are shown to be denominated in GBP and Yen, respectively.

In some instances, financial institutions A-D and P-S may be located in different countries. For instance, financial institutions A-D may each be located in the United States or US Territories, and financial institutions P-Q may be located in various European and Asian countries.

In some embodiments, the sender 102 and bidder 106 may have associated user device(s) 110. The user devices 110 can be or include a mobile device, a personal computer, a laptop, a tablet, a smart appliance or smart watch, etc. The sender 102 may use their associated user device(s) 110 for submitting a request for remittance. The bidder 106 may use their associated user device(s) 110 for bidding on requests submitted by various senders 102.

The system 100 is shown to include a remittance computing system 112. As will be discussed in further detail below, the remittance computing system 112 may be or include various circuits which include memory, processors, servers, etc., which store and execute various rules and parameters for 1) receiving requests for remittance from a sender to a recipient, 2) matching the request with particular eligible bidders, 3) receiving bids from the eligible bidders, 4) receiving a selection of a bid from the sender, and 5) initiating at least one intrabank transfer from the sender to the bidder(s) and at least one intrabank transfer from the bidder(s) to the recipient.

Figure 2:
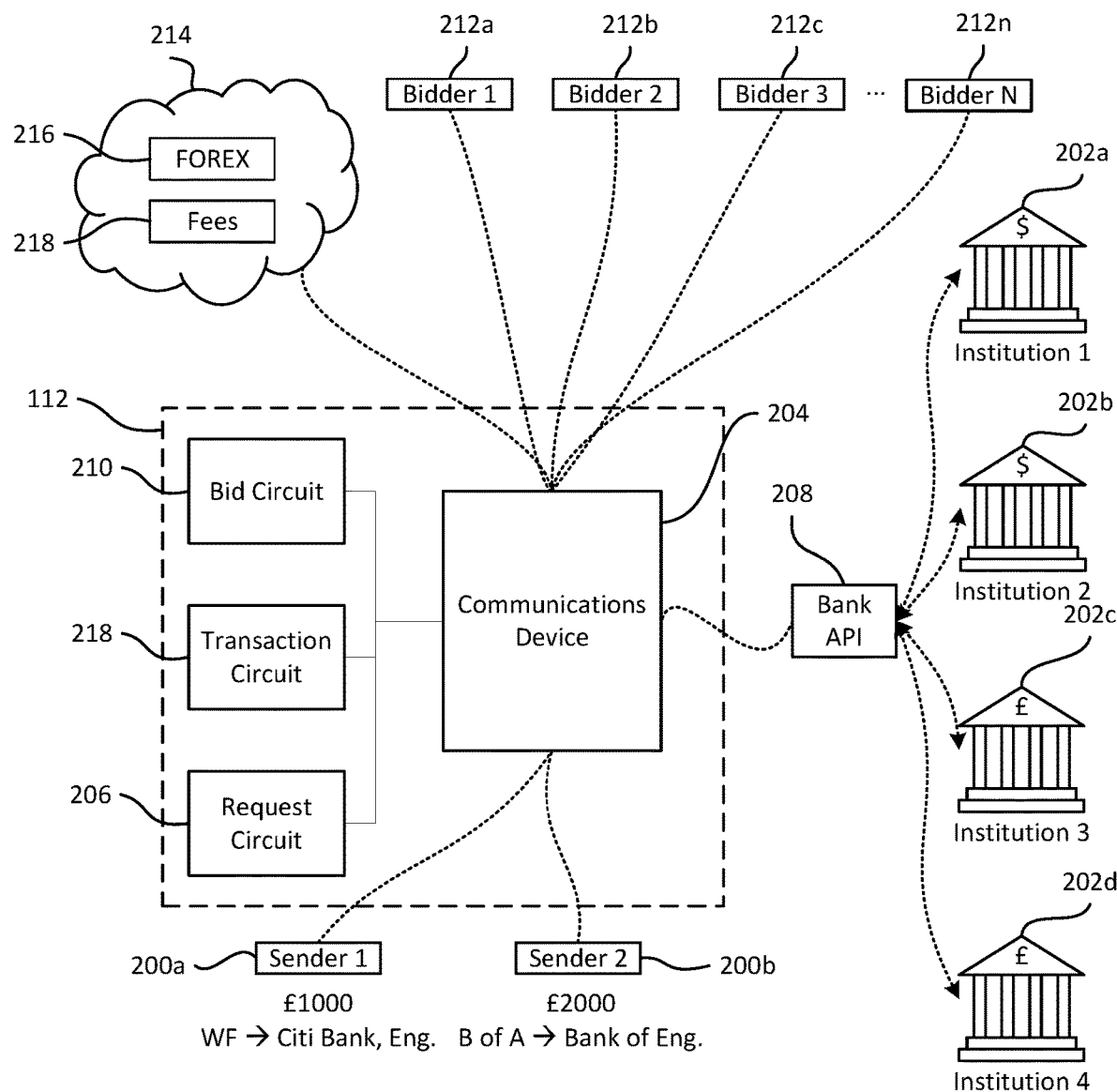
FIG. 2 shows a remittance computing system, according to an exemplary embodiment.

Referring now to FIG. 2, the remittance computing system 112 is shown in greater detail, according to an exemplary embodiment. In the embodiment shown in FIG. 2, two senders 200a and 200b are shown. Additionally, four financial institutions 202a-202d are shown. These four financial institutions 202a-202d may be located in different countries. For instance, two financial institutions 202a-202b may be located in the United States, where as the other financial institutions 202c-202d may be located in England. Accordingly, accounts with financial institutions 202a-202b may be denominated in a first currency (e.g., USD), and accounts with financial institutions 202c-202d may be denominated in a second currency (e.g., GBP).

The remittance computing system 112 includes one or more circuits. As will be discussed in further detail below, the circuits may include one or more processors communicably coupled to one or more memory or memory devices. The processors may execute instructions stored in the memory (or otherwise accessible to the processors).

The remittance computing system 112 may include a communications device 204. The communications device(s) 204 can be or include components configured to transmit and/or receive data from one or more remote sources. For instance, each of the user device(s) 110 may include a respective communications device 204 and the remittance computing system 112 may include a corresponding communications device 204. Each of the respective communications devices 204 may permit or otherwise enable data to be exchanged between the various user(s) (via their corresponding user devices 110) and the remittance computing system 112. The communications device 204 may communicate with these user devices 110 via a network. The network may be a Local Area Network (LAN), a Wide Area Network (WAN), a Wireless Local Area Network (WLAN), an Internet Area Network (IAN), cloud-based network, etc. In some implementations, the communications device(s) 204 may access the network to exchange data with various other communications device(s) via cellular access, a modem, broadband, Wi-Fi, satellite access, etc.

The remittance computing system 112 may include a request circuit 206. The request circuit 206 may be a circuit implemented to perform functions related to requests that were submitted via a user device (e.g., user device 110). In some embodiments, the request circuit 206 may be communicably coupled to the user devices 110 (e.g., via the communications device 204 over a corresponding computer network). For instance, the request circuit 206 may execute instructions to generate the GUI 300 which is rendered by the user device 110 on a display for the user device 110. The request circuit 206 may communicate instructions (via the communications device 204) to the user device 110 to render the GUI 300 on the display for the user device 110. Additionally, where feedback or other inputs are provided by the user to the GUI 300, such feedback or other inputs may be communicated via a corresponding communications device for the user device 110 to the communications device 204 and to the request circuit 206.

Figure 3:
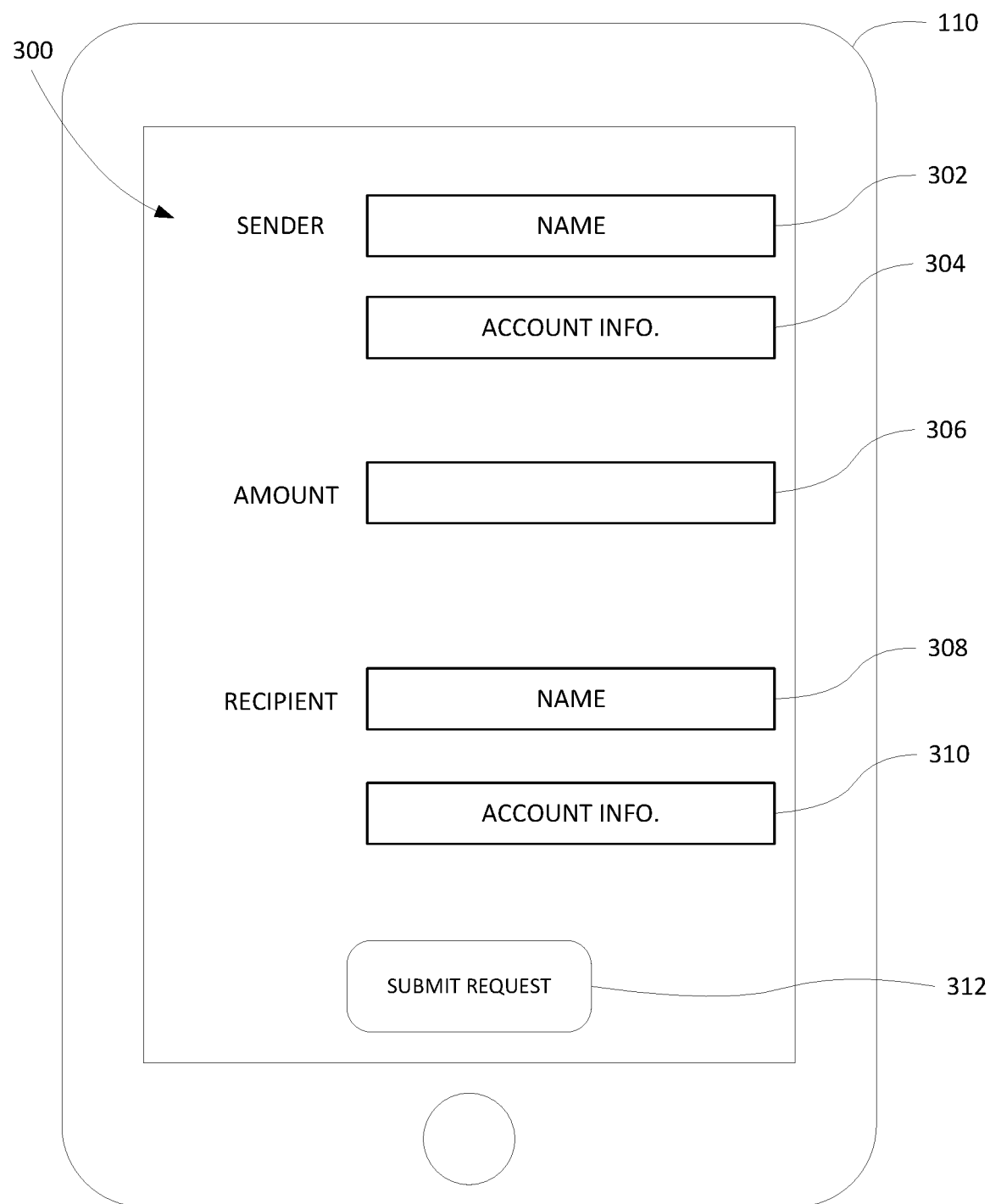
FIG. 3 shows an example graphical user interface (GUI) for initiating a request for remittance, according to an exemplary embodiment.

Referring now to FIG. 2 and FIG. 3, the sender 200 may initiate a request. For example, shown in FIG. 3 is an example GUI 300 for initiating a request for remittance, according to an exemplary embodiment. The GUI 300 may be displayed or otherwise rendered on the user device 110 for the sender 200. As stated above, the GUI 300 may be generated by the request circuit 206, and communicated to the user device 110 via the communications device 204. The GUI 300 may be received by the user device 110 and displayed on a display for the user device 110. The sender 200 may provide various information within the GUI 300 for initiating the request. For instance, the GUI 300 may include various input boxes. The GUI 300 may include an input box 302 for the sender 200 to provide their name and another input box 304 for the sender 200 to provide their account information (e.g., account number, routing number).

In some embodiments, the sender 200 may provide log-in information (such as a username or email and password). Such log-in information and corresponding accounts may be stored in memory. For instance, various users may register personal and bank account information by initially providing log-in information and a password to a website, web portal, application, etc. This information may be communicated from the user device 110 and received by the request circuit 206 via the communications device 204. The bank account information and log-in information may be saved as being associated with one another on memory.

When the proper log-in information is provided, the sender 200 may then select the account from which it desires to transfer funds from a drop-down menu. In the example shown in FIG. 2, the first sender 200a may select an account held with Wells Fargo, and the second sender 200b may select an account held with Bank of America.

When the sender 200 selects an account, the GUI 300 may display an account balance for the selected account. In some embodiments, the request circuit 206 may access such information via the communications device 204 through a bank application programming interface (API) 208. The bank API 208 may be an interface for a developer to receive or exchange data with a financial institution 202. The bank API 208 may be generated or otherwise maintained by the financial institutions 202.

Following the sender 200 selecting an account, the sender 200 may then provide an amount via input box 306. In some embodiments, the sender 200 may not be able to provide an amount that is greater than their account balance. In some embodiments, the request circuit 206 compares the amount provided by the sender 200 in the input box 306 to the account balance identified via the bank API 208. Where the amount provided by the sender 200 exceeds the account balance, the request circuit 206 may control the GUI 300 to indicate that the user does not have sufficient funds for the request. The indication may take the form of a textual prompt (e.g., "Sorry, you do not have sufficient funds for this request."), or disabling one or more buttons on the GUI 300. Continuing the example depicted in FIG. 2, sender 200*a* may provide an amount of $1000 in input box 306, whereas sender 200*b* may provide an amount of $2000 in input box 306. Each of these senders 200*a*, 200*b* may have an account balance greater than $1000 and $2000, respectively. In some embodiments, the amount provided via input box 306 is in the currency of the sender's 200 account. However, in other embodiments, the GUI 300 also includes a currency selection menu that allows the sender 200 to specify the amount in a different currency, such as the recipient's local currency.

Where the sender 200 provides an amount that is less than the account balance, the sender 200 may then provide recipient information in input box 308 (e.g., name) and input box 310 (e.g., account information). In some embodiments, the recipient information includes a unique identifier associated with the recipient, such as an email address or a phone number that is linked to the recipient's account. The recipient's account information may be identified similar to the sender's account information described above. In some instances, the sender and recipient may be the same person. For instance, the sender may request remittance to an offshore account owned by the sender (e.g., a remittance from sender's account with financial institution A located in County A to the sender's account with financial institution B located in Country B). Such a sender benefits from reduced transaction costs according to the embodiments described herein.

The request circuit 206 may determine which financial institution 202 holds the recipient's account based on the account information. Continuing the example depicted in FIG. 2, sender 200*a* may provide account information that indicates the recipient's account held by the fourth financial institution 202*d* (for instance, Citibank in England), whereas sender 200*b* may provide account information that indicates the recipient's account held by the third financial institution 202*c* (for instance, Bank of England). These financial institutions may be identified by the request circuit 206.

Accordingly, the request circuit 206 may generally identify the financial institution 202 for the sender's 200 account and the financial institution 202 for the recipient's account. In some embodiments (such as those depicted in FIG. 2), the financial institution 202 for the sender 200 and the financial institution 202 for the recipient may not be the same institutions. For instance, the financial institutions 202 may be located in different countries. Additionally, the financial institutions 202 may maintain accounts that are denominated in different currencies.

Once the sender 200 has filled out the information in GUI 300 (e.g., sender information in input boxes 302-304, amount for remittance in input box 306, and recipient information in input boxes 308-310), the sender 200 may select a button 312 for submitting the request for remittance. In some embodiments, the button 312 for submitting the request may not be available for selection (e.g., the button 312 is grayed out, not displayed, etc.) unless and until all the information is provided within the GUI 300. When the button 312 is selected, information corresponding to the request may be distributed to other various components within the remittance computing system 112, as will be discussed in greater detail below.

In some embodiments, once the sender 200 submits the request (through selection of button 312), the request circuit 206 may control, via the communications device 204, the GUI 300 to prompt the sender 200 to save the request for future use. For instance, the sender 200 may have a recurring need/desire to remit funds to particular accounts. By saving the request, the sender 200 may be able to quickly provide a request. Such saved request may be saved in a database or server and accessed by the request circuit 206 via a data API for the server/database. Additionally or alternatively, such a saved request may be saved in memory.

In some embodiments, when the sender 200 provides their name in input box 302 (or otherwise logs into a portal for accessing the GUI 300 for submitting a request for remittance), any saved requests may be displayed on the GUI 300 to the sender 200. The sender 200 may then select a request for remittance from the saved requests, and the corresponding information may be automatically populated into the GUI 300. The sender 200 may modify various data in the input boxes 302-310 (such as amount, various account information, etc.). The sender 200 may then submit the request as described above. Such embodiments may increase the speed at which a sender 200 can fill out GUI 300 and thereby increase user friendliness.

The remittance computing system 112 is shown to include a bid circuit 210. The bid circuit 210 may be configured to receive, via the communications device 204, bids from one or more bidders 212 for satisfying the request from the sender (e.g., sender 200).

In some embodiments, a plurality of bidders 212 may have access to (and be able to bid on) various requests. The bid circuit 210 may identify particular bidders 212 from the plurality of bidders 212 based on which bidders are eligible to submit a bid for satisfying a request from a sender 200. The bid circuit 210 may execute rules stored on memory for identifying the eligible bidders 212. The rules stored on memory may include one or more rules to identify the financial institution for the sender and the financial institution for the recipient. The rules stored on memory may include one or more rules to identify bidders 212 as being eligible based on accounts for the bidders 212. Each bidder 212 may have at least two or more accounts with different financial institutions 202. For instance, the first bidder 212*a* may have a first account with the first institution 202*a* and a second account with the third institution 202*c*. Additionally, the second bidder 212*b* may have a first account with the second institution 202*b* and a second account with the fourth institution 202*d*. The third bidder 212*c* may have a first account with the second institution 202*b* and a second account with the fourth institution 202*d*. Each of these bidders 212*a*-212*c* may be eligible to submit bids only for requests for remittances that are from one financial institution 202 where they hold an account to another financial institution 202 where they hold an account.

The bid circuit 210 may access account information (for instance, stored on memory) for each of the bidders 212. Additionally or alternatively, the bid circuit 210 may be communicably coupled to bank APIs 208 for each of the financial institutions 202*a*-202*d*. The bid circuit 210 may identify bidders 212 having accounts with both the financial institution 202 of the sender 200 and the financial institution 202 of the recipient. Continuing the example described above, where the sender 200 is requesting a remittance of funds from an account with the first financial institution 202*a* to an account with the third financial institution 202*c*, the bid circuit 210 may identify the first bidder 212a as one eligible bidder, because the first bidder 212a holds accounts at both the first and third financial institutions 202a, 202c.

In some embodiments, the rules stored on memory may further include rules to identify bidders having sufficient funds to satisfy the request from the sender 200. The bid circuit 210 may access account data for each of the bidders 212 via the bank APIs 208. The account data may include, for instance, general identification that a particular bidder 212 has an account with a particular financial institution. Additionally, the account data may include an amount of funds in the account. In some instances, the account data may include the denomination of the funds in the account. As one example, a particular bidder may have an account with Citibank, England having £1,200.00. The bid circuit 210 may access the bank API 208 corresponding to Citibank, England and identify 1) that the particular bidder has an account with Citibank, England, and 2) the bidder's account has at least £1,000.00. In some embodiments, the bid circuit 210 may identify those bidders as being eligible who have accounts with the same financial institution as the accounts of both the sender and the recipient and their accounts have sufficient funds for satisfying the request from the sender. In some embodiments, bidders may be able to "pool" bids to form a group bid that collectively satisfies a request, as will be discussed in further detail below.

When eligible bidders 212 are identified, those bidders 212 may receive a notification indicating an option to bid on a request. Such notification may be communicated from the bid circuit 210 via the communications device 204 to user devices 110 associated with the eligible bidders 212. In other embodiments, bidders 212 may access a website (or web portal or application, etc.) where requests which they are eligible to bid on are displayed.

Figure 4:
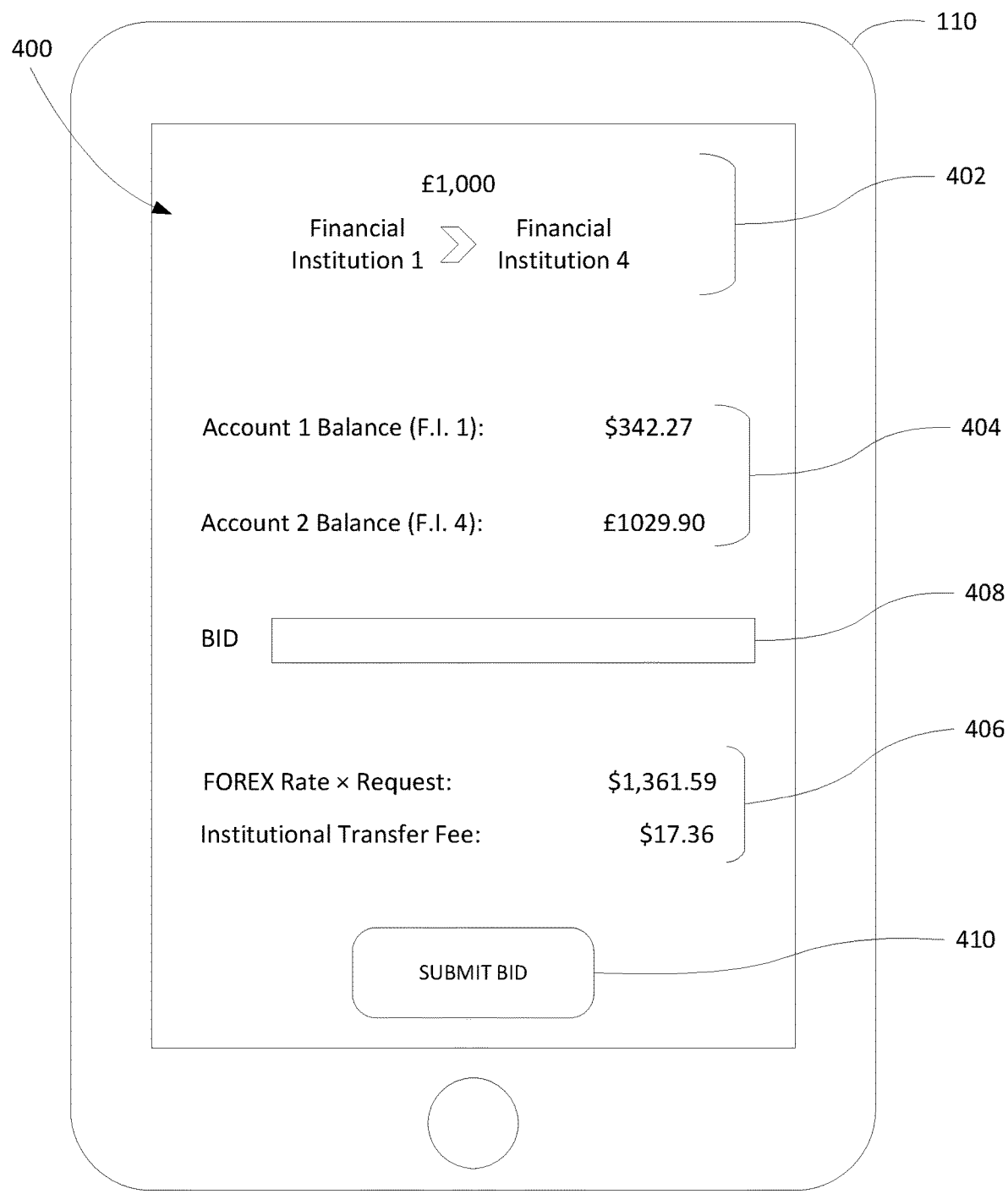
FIG. 4 shows an example GUI for submitting bids to satisfy a request for remittance, according to an exemplary embodiment.

Referring now to FIG. 2 and FIG. 4, a bidder 212 may submit a bid to satisfy a request from a sender 200. Specifically, depicted in FIG. 4 is an example GUI 400 for submitting bids to satisfy a request for remittance, according to an exemplary embodiment. In some embodiments, the bid circuit 210 may execute instructions to generate the GUI 400 which is rendered by the user device 110 on a display for the user device 110. For instance, the bid circuit 210 may communicate instructions (via the communications device 204) to the user device 110. The instructions may instruct the user device 110 to render the GUI 400 on the display for the user device 110. Additionally, where feedback or other inputs are provided by the user to the GUI 400, such feedback or other inputs may be communicated from the user device 110 to the bid circuit 210 via the communications device 204.

In some embodiments, the GUI 400 may include a textual output 402 pertaining to the request for remittance. For instance, the textual output 402 may include an amount for the remittance, the financial institution corresponding to the account for the sender 200, and the financial institution corresponding to the account for the recipient. In the example depicted in FIG. 4, the GUI 400 may correspond to the request for remittance from the sender 200a (e.g., $1,000 from an account with the first financial institution 202a to an account with the fourth financial institution 202d).

The GUI 400 may include textual outputs 404 indicating account balances for the bidder's 212 accounts with the financial institutions 202 corresponding to the request (e.g., the same financial institutions 202 as the financial institution 202 for the account of the sender 200 and the financial institution 202 for the account of the recipient).

In some embodiments, the GUI 400 may include institutional transfer information 406. The institutional transfer information 406 may include, for instance, a foreign exchange (FOREX) rate multiplied by the amount of the request and/or institutional transfer fees for satisfying the request. The bid circuit 210 may be communicably coupled via the communications device 204 to a remote source 214, such as a server, database, etc., that stores data corresponding to FOREX rates 216 for transferring money between various countries. Such FOREX rates 216 may be updated in real-time (or near real-time), at predetermined intervals etc. The institutional transfer information 406 may include the FOREX information so that bidders 212 can be made aware of the current FOREX rate to determine whether it is sufficiently high. For instance, where a FOREX rate is relatively low, some bidders 212 may not want to submit a bid.

Additionally, the bid circuit 210 may access institutional transfer fee information 218 for satisfying the request. The transfer fee information 218 may be transfer fees which would be charged to the sender for satisfying the request via, for instance, an automated clearing house, wire transfer, or third-party vendor (hereinafter "third-party institution"). For a given request to be satisfied, the bid may be based on the FOREX rate and the institutional transfer fee. In some instances, the bidder(s) 212 may use the given FOREX rate, but a transfer fee that is less than the institutional transfer fee identified in the institutional transfer fee information 218. Accordingly, the embodiments described herein may decrease overall transaction costs for satisfying the request by using a bid with a transfer fee that is less than the institutional transfer fee provided to the bidder(s) 212. As the FOREX rate and transfer fees are updated, the institutional transfer information 406 provided in the GUI 400 may be correspondingly updated.

The communications device 204 may be communicably coupled to the remote source 214 through, for instance, a FOREX API similar to the bank API 208 described above. The bid circuit 210 may control the communications device 204 to access the FOREX rates corresponding to an exchange between the country within which the account for the sender 200 is held and the country within which the account for the recipient is held. The bid circuit 210 may also access the FOREX API to access institutional transfer fees corresponding to the exchange. In some embodiments, the FOREX rates and institutional transfer fees may be displayed on the GUI 400 as a rate from the denomination of the account for the sender 200. In other embodiments, the FOREX rate may be multiplied by amount to be sent to the recipient, and the institutional transfer information 406 displayed on the GUI 400 may be the amount for satisfying the request according to the FOREX rate. In the example depicted in FIG. 4, the amount for satisfying the request to remit £1000 to an account at Citibank in England may be $1,361.59 using the FOREX rate. Additionally, the institutional transfer fee may be $17.36 for satisfying the request via a third-party institution. Such embodiments may increase the likelihood that bidders 212 provide bids that are more favorable to the sender 200 than satisfying the request through a third-party institution.

In embodiments where the institutional transfer information 406 is not included in the GUI 400, the bid circuit 210 may apply various rules to the bids submitted by bidders 212. For instance, the bid circuit 210 may compare the amount for satisfying the request via a third-party institution (e.g., the sum of the FOREX rate multiplied by the request and the institutional transfer fee) to each of the bids. Where the amount for satisfying the request via the third-party institution is more favorable to the sender 200 than a bid, such bid may be filtered out. Accordingly, only bids that are more favorable to the sender 200 than the FOREX rate may be used or otherwise provided to the sender 200.

A bidder 212 may provide a bid in input box 408. According to the embodiments described herein, the bidder 212 likely will provide a bid that is more favorable than satisfying the request via the third-party institution. Continuing the example of FIG. 2 and followed in FIG. 4, the bidder 212 may provide a bid that is less than the sum of $1361.59 and $17.36 (or $1378.95) for transferring £1,000 to the account of the recipient. Accordingly, the sender 200 would save money through the intrabank transfers, as described in further detail below, by selecting the bid from the bidder 212 rather than using traditional third-party institutions.

Once the bidder 212 provides a valid bid in the input box 408 (e.g., a bid that is more favorable to the sender 200 than the initiating the transfer via a third-party institution), the bidder 212 may select a button 410 to submit the bid. Submitted bids may be received by the bid circuit 210 via the communications device 204. In some embodiments, particularly those where the bidder 212 is not provided FOREX information, the bid submitted by the bidder 212 may be evaluated by the bid circuit 210, as will be discussed in greater detail below. Additionally, the bidder 212 may revise their bid, as will be discussed in greater detail below. The bid circuit 210 may store each (or a subset) of the bids received in memory.

In some embodiments, some bidders 212 may have an auto-execute rule. For instance, some bidders 212 may have rules which they have set up that, when the bidder 212 is eligible for submitting a bid, a bid is automatically submitted. Such bid may be a percentage of the sum of the institutional transfer fee, a dollar amount off the institutional transfer fee, etc. In embodiments such as these, the bidder 212 may not need to manually submit a bid. Such bids may be automatically generated and submitted according to rules set up by the bidders 212.

While the bid is described as being an amount equal to the sum of the FOREX rate multiplied by the amount of the request and a transfer fee, in some embodiments, the bid may be a bid on the transfer fee. In these embodiments, the bidder 212 may provide a transfer fee for satisfying the request (e.g., less than the institutional transfer fee), and the FOREX rate is automatically applied to the request. Such embodiments may increase the user-friendliness of the GUI 400 for the bidder 212 by simplifying the interface.

Figure 5:
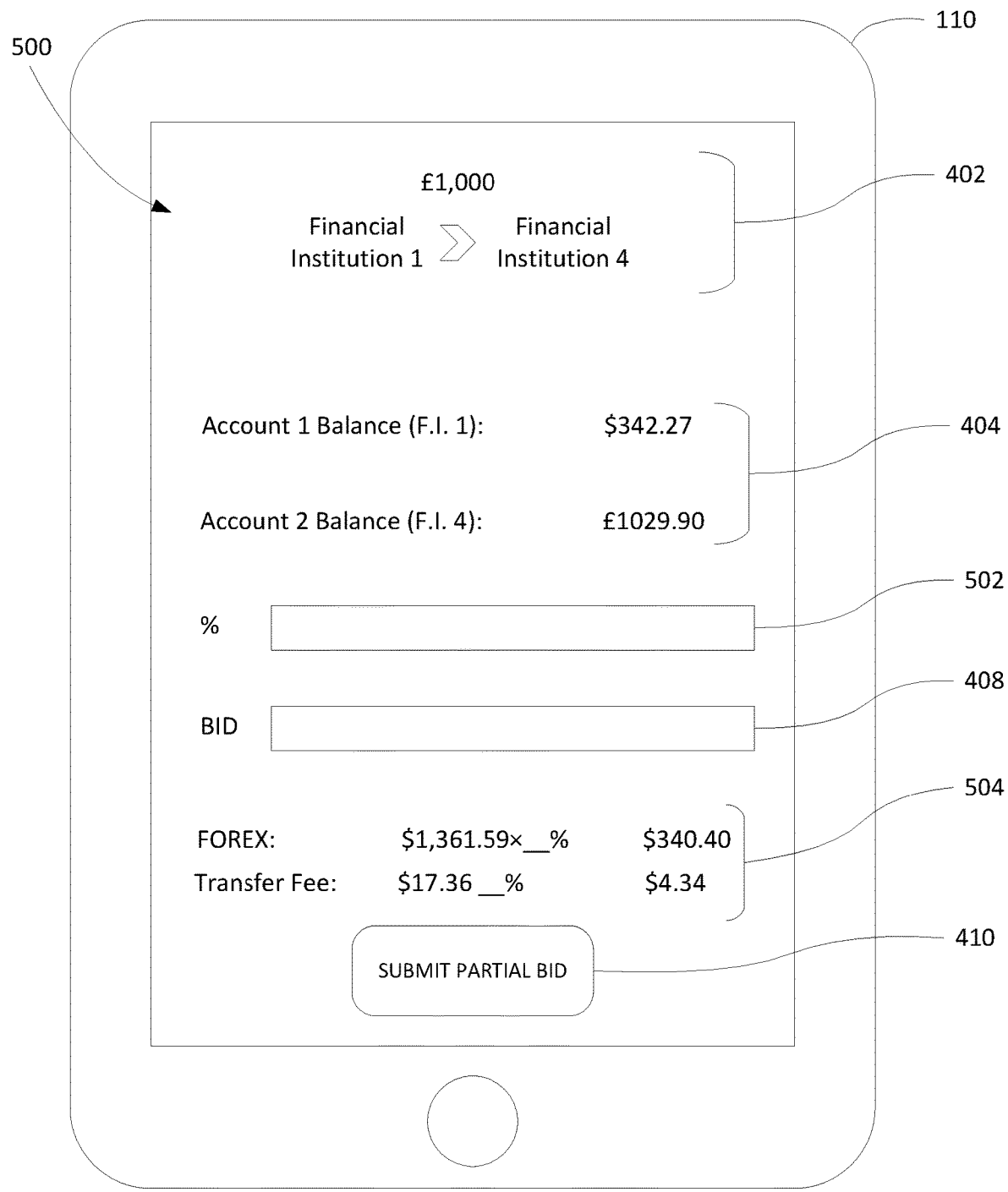
FIG. 5 shows an example GUI for submitting partial bids to satisfy a request for remittance, according to an exemplary embodiment.

Referring now to FIG. 2 and FIG. 5, in some embodiments, a bidder 212 may submit a partial bid. Specifically depicted in FIG. 5 is an example GUI 500 for submitting partial bids to satisfy a request for remittance, according to an exemplary embodiment. The GUI 500 shown in FIG. 5 includes many of the same aspects as shown in the GUI 400 in FIG. 4. Accordingly, these aspects will not be discussed for purpose of brevity. However, of particular relevance in FIG. 5 is the aspects pertaining to submitting a partial bid.

In some embodiments, bidders 212 may be prompted to submit a partial bid where no single bidder 212 has sufficient funds in their respective accounts with the financial institution 202 associated with the account for the recipient. In other embodiments, bidders 212 may be prompted to submit a partial bid regardless of whether any bidders have sufficient funds for satisfying the request from the sender 200.

Accordingly, in embodiments such as these, bidders 212 may be shown a GUI similar to GUI 500 (rather than GUI 400).

The GUI 500 may include an input box 502 for providing a percentage (or portion) of the request which the bidder 212 is planning to satisfy. For instance, the bidder 212 may only submit a bid on 25% of the request. Where the bidder 212 submits a bid on a percentage or portion of the request, the bidder 212 may provide more favorable bids to the sender 200.

The percentage provided in the input box 502 may be applied to the institutional transfer information 406 (of FIG. 4) to provide modified institutional transfer information 504. The modified institutional transfer information 504 may provide the FOREX rate according the proportion of the bid. For instance, where the bidder 212 submits a bid on 25% of the request, the FOREX rate multiplied by the amount to be sent to the recipient may further be reduced by 75%. Accordingly, the bidder 212 is provided the proportional amount for satisfying the request according to the FOREX rate so that the bidder 212 can bid accordingly. Similarly, the institutional transfer fee may also be reduced by 75% so that the bidder 212 can bid accordingly. The bidder 212 may then provide a bid in the input box 408 and select button 410 for submitting the partial bid.

In embodiments where partial bids are accepted, such partial bids may be pooled together to form a group bid. For instance, where four bidders 212 submit bids on 25% of the request, these four bids may be pooled together to form a group bid that collectively satisfies the request. While even numbers are used for purposes of clarity, bidders 212 may provide bids on any percentage or portion of a request. Where the number of bids cannot be pooled together to collectively satisfy a request, the bid circuit 210 may communicate (e.g., via communications device 204) a request to modify one or more bids to one or more of the bidders 212 so as to fulfil the request. For instance, where 95% of the request is accounted for, the bid circuit 212 may submit a request to one or more of the bidders 212 that are pooled for increasing their proportion by 5%. In some embodiments, such request may be communicated to the bidder 212 who submitted the most favorable bid. In other embodiments, such request may be communicated to the bidder 212 who submitted the greatest proportion of the request. In still other embodiments, such request may be communicated to the bidder 212 who submitted the smallest proportion of the request. In still other embodiments, such request may be communicated to each of the bidders 212 whose bids are being pooled. Accordingly, in each of these embodiments, the bid circuit 210 may communicate a request for at least some of the bidders 212 to modify the proportion of their bids such that the group bid collectively satisfies the request.

Figure 6:
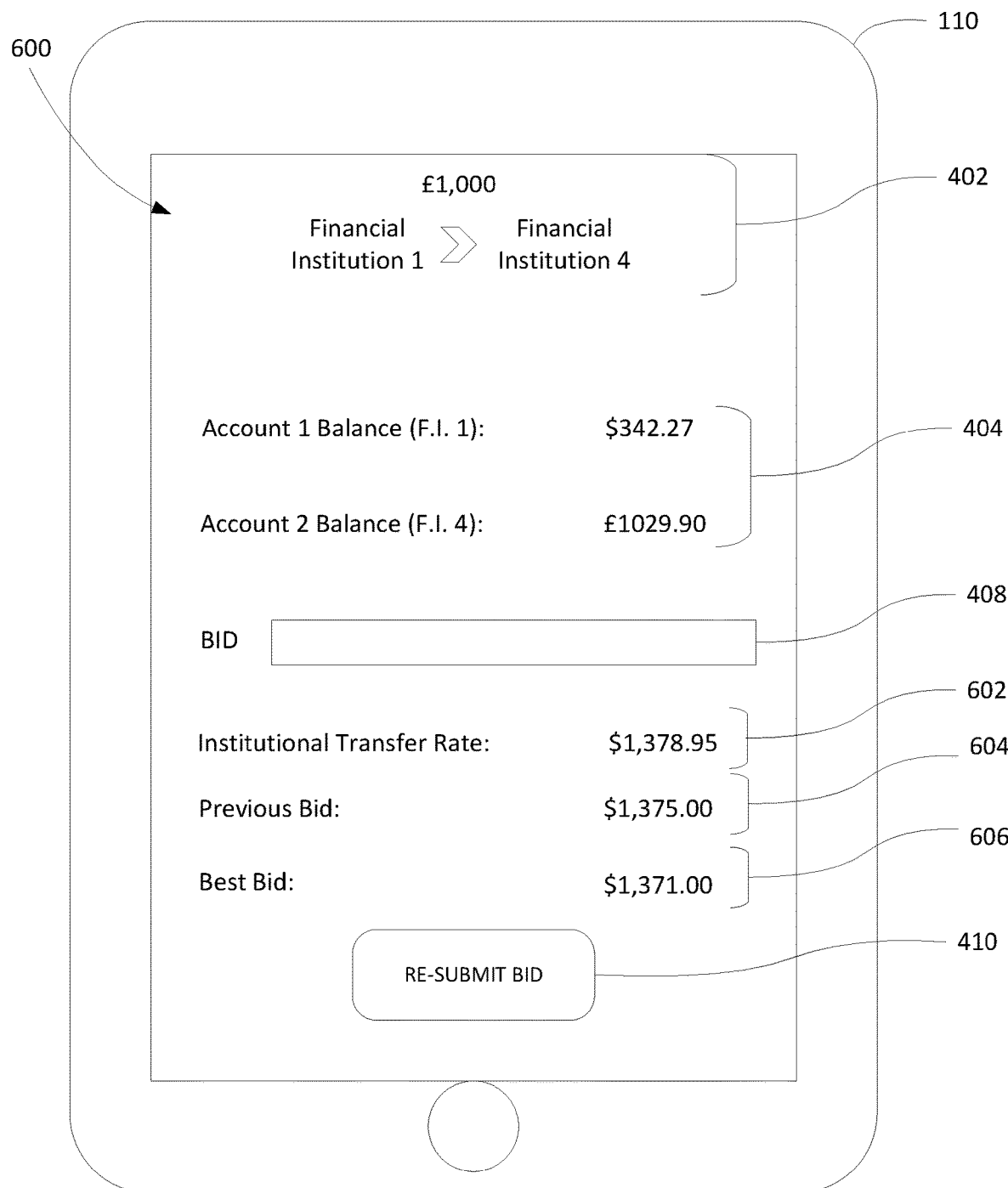
FIG. 6 shows an example GUI for modifying a bid previously submitted by a bidder, according to an exemplary embodiment.

Referring now to FIG. 2 and FIG. 6, in some embodiments, the bid circuit 210 may generate a request to modify a bid to the bidders 212 who previously submitted a bid for satisfying a request from a sender 200. Such a request may be sent to the bidders 212 so that the bidders 212 can modify their request, should they choose to do so. Specifically depicted in FIG. 6 is an example GUI 600 for modifying a bid previously submitted by a bidder, according to an exemplary embodiment. The bid circuit 210 may generate the request following a predetermined duration of time after the request is submitted (for instance, one hour, two hours, a day, etc.). Additionally or alternatively, the sender 200 may submit the request for bidders 212 to re-submit bids via the sender's 200 user device 110. In both arrangements, the request may be communicated via the communications device 204 to the user device 110 for each bidder 212 to display on a display for the respective user device 110. The request may include various data for generating (or displaying) the GUI 600. The GUI 600 may be similar to the example GUIs described above with reference to FIG. 4 and FIG. 5. Accordingly, many aspects will not be discussed for purpose of brevity.

In some embodiments, the example GUI 600 may display an institutional transfer rate 602. The institutional transfer rate 602 may be the sum of the institutional transfer information 406 provided in GUI 400 (e.g., the FOREX rate multiplied by the amount of the request and the institutional transfer fee). It should be noted that, in some embodiments, the institutional transfer rate 602 may also be provided on the other GUIs (e.g., GUI 400, GUI 500, etc.). Such embodiments may simplify the user experience for the bidders 212.

In some embodiments, the example GUI 600 may display the bidder's 212 previous bid 604 which they previously submitted. Such information may be communicated with the request by the bid circuit 210. Additionally, the GUI 600 may also display the best bid 606 (single and/or group bid) submitted by all bidders 212. In some embodiments, the best bid 606 may also be displayed during the initial bid process (e.g., on GUI 400). The bidder 212 may choose to modify their bid based on the best bid 606. Such embodiments may increase the likelihood of the sender having favorable bids for satisfying the request.

Figure 7:
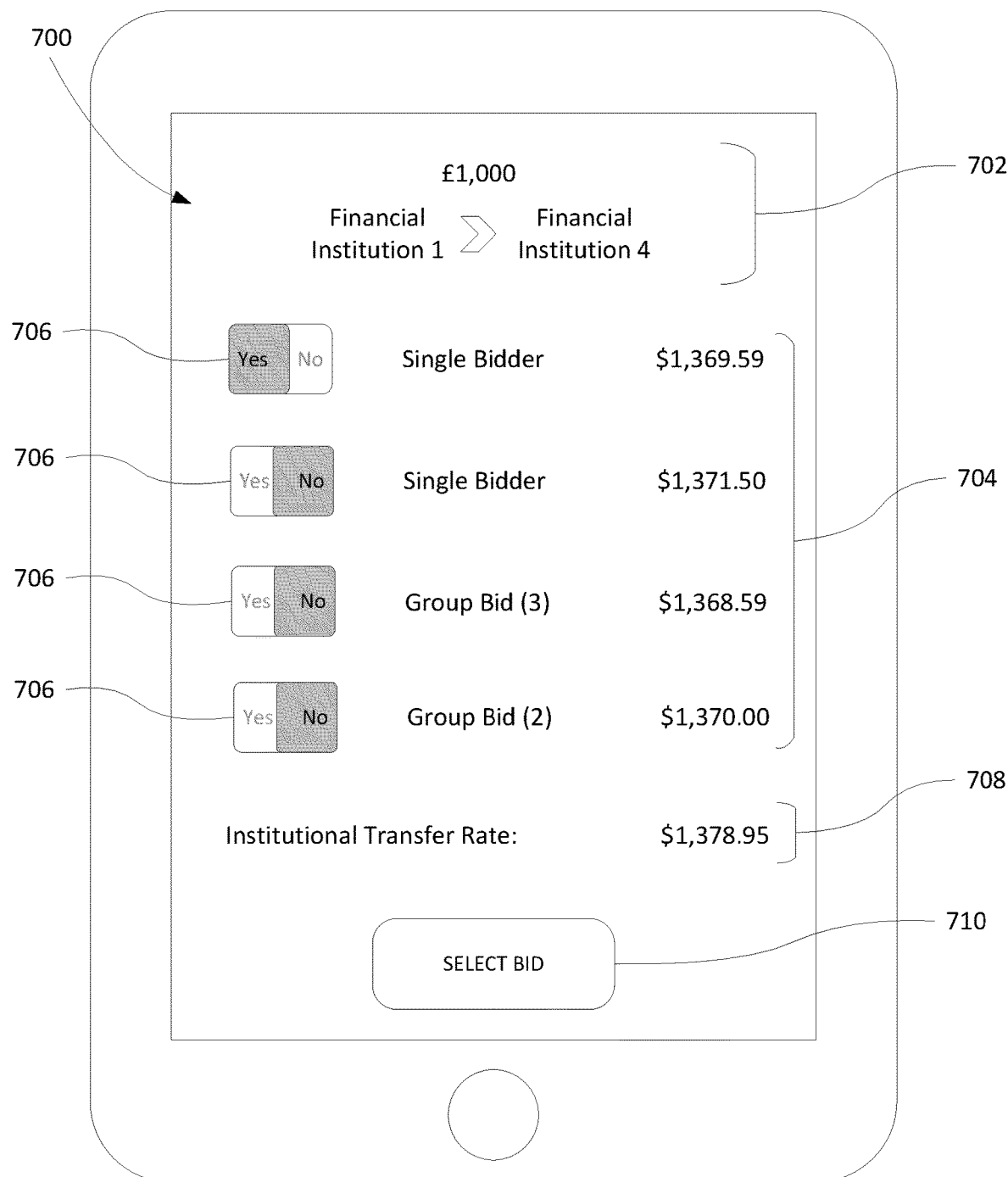
FIG. 7 shows an example GUI for selecting a bid from a plurality of submitted bids, according to an exemplary embodiment.

Referring now to FIG. 2 and FIG. 7, once all bids are received (following optional re-bidding), the bids may be provided to the sender 200 for selection. Specifically depicted in FIG. 7 is an example GUI 700 for selecting a bid from a plurality of submitted bids, according to an exemplary embodiment. In some embodiments, the request circuit 206 may execute instructions to generate the GUI 700 which is rendered by the user device 110 on a display for the user device 110. For instance, the request circuit 206 may control the communications device 204 to communicate instructions to render the GUI 400 on the display for the user device 110. Additionally, where feedback or other inputs are provided by the user to the GUI 700, such feedback or other inputs may be communicated from the user device 110 to the bid circuit 210 via the communications device 204.

The GUI 700 is shown to include a textual output 702 pertaining to the request for remittance. For instance, the textual output 702 may include an amount for the remittance, the financial institution corresponding to the account for the sender 200, and the financial institution corresponding to the account for the recipient. Such information may be provided to the sender 200 as a reminder of which request the corresponding bids pertains to. In the example depicted in FIG. 7, the GUI 400 may correspond to the request for remittance from the sender 200a (e.g., $1,000 from an account with the first financial institution 202a to an account with the fourth financial institution 202d).

As shown, the GUI 700 may include a plurality of bids 704. In some embodiments, the plurality of bids 704 may be a subset of those bids submitted by the bidders 212. For instance, the subset may be the most favorable single and group bids to the sender 200. In other embodiments, each of the bids may be displayed or otherwise provided to the sender 200 via the GUI 700.

In embodiments where the bids 704 shown on the GUI 700 is a subset of bids, the request circuit 206 may execute rules for identifying which of the bids submitted should be included in the subset. The request circuit 206 may store such rules, for instance, in local memory, at a remote server or database, etc. In some embodiments, the request circuit 206 may identify the most favorable group bid(s) and the most favorable single-bidder bid(s). The request circuit 206 may identify bids as favorable based on a comparison of the amount of funds to be transferred from the sender to the bidder(s) 212 for fulfilling the request. The bids most favorable are the bids where the sender 200 sends the least amount of funds to the bidder(s) 212 for fulfilling the request. The request circuit 206 may identify the most favorable bids, and those bids may be included in the GUI 700.

In some embodiments, the sender 200 may indicate a desire not to accept partial bids (e.g., while filling out GUI 300 for submitting the request, in saved account information, etc.). In such embodiments, partial bids may not be accepted by bidders 212 (e.g., input box 502 is not displayed) and, as such, no partial bids are shown in the plurality of bids 704.

The GUI 700 may include a plurality of buttons 706 associated with each of the plurality of bids 704. The buttons 706 may be defaulted to a particular position (e.g., indicating the selection "NO"). The sender 200 may then select a bid from the plurality of bids by indicating as such through the corresponding button 706. For example, the sender 200 may select the lowest bid from a single bidder 212 (e.g., $1,369.59) by sliding the corresponding button 706 from "NO" to "YES." As another example, the sender 200 may select the lowest bid out of the plurality of bids 704 displayed on the GUI 700 (e.g., $1,368.59) by sliding the corresponding button 706 from "NO" to "YES." While described as buttons 706, it should be understood that bids may be shown in a drop down list and a bid may be selected by highlighting the selected bid, as another example. Accordingly, the present disclosure is not limited to either arrangement.

The sender 200 may be provided with the FOREX information 708 for reference, which can be identified in a manner similar to the manner described above.

Once the sender 200 indicates which bid they intend to select from the plurality of bids 704, the sender 200 may then select a button 710 to select the bid. In some embodiments, the button 710 for selecting the bid may not be available for selection (e.g., grayed out, not displayed, etc.) unless and until the sender 200 indicates which bid they intend to select by selecting the corresponding button 706.

Once a user indicates which bid they intend to select from the plurality of bids and selects the button 710 to select the bid, the bid may be locked. Accordingly, the bid may not be withdrawn or otherwise modified by the corresponding bidder 212. Once the bid is locked, the locked bid and corresponding account information may be distributed to other components of the remittance computing system 112, as will be discussed in further detail below. In some embodiments, the sender 200 and/or the bidder 212 may be notified that the bid has been locked by the sender 200. Such a notification may be communicated via the communications device 204 to the sender 200 and/or bidder 212 through their corresponding user devices 110.

In some embodiments, the sender 200 may have an auto-select option associated with the request. Such an option may be to automatically select the bid that transfers the least amount of funds from the account of the sender 200 to the account(s) of the bidder(s) 212. Such option may be selected when the request is submitted. Additionally or alternatively, such option may be stored in a profile associated with the sender 200 (e.g., on a database, server, memory, etc.) similar to that described above with reference to the recurring requests.

In some embodiments, once the sender 200 selects a bid and locks the bid, various particulars for the locked bid may be communicated via the communications device 204 to a user device 110 for the recipient. For instance, the recipient may receive a notification indicating that the bid has been locked and that they will receive funds shortly. Additionally or alternatively, the notification may further indicate that the bid is being satisfied by a single bidder or a group bid. In some embodiments, the notification may include an override button that permits the recipient to override the selection by the sender 200. For instance, the recipient may override the selection where the sender 200 selected a group bid. When the recipient selects the override button, the recipient may indicate why they are overriding the selection. The request circuit 206 may receive, via the communications device 204, an indication that the recipient overrode the selection and the request circuit 206 may communicate corresponding information to the user device 110 for the sender 200 (e.g., an indication that the recipient overrode the selection and the reason provided by the recipient). The sender 200 may re-select a bid on a GUI similar to the example GUI 700 of FIG. 7.

Referring back to FIG. 2, the remittance computing system 112 may include a transaction circuit 218. The transaction circuit 218 may be communicably coupled to the request circuit 206 and the bank APIs 208. The transaction circuit 218 may generate instructions to send to various financial institutions 202 for transferring funds. For instance, the transaction circuit 218 may generate instructions to communicate to the financial institutions 202 through the bank APIs 208. The financial institutions 202 may receive the instructions from the transaction circuit 218 and transfer funds according to those instructions.

Where a bid is locked (and not optionally overridden by the recipient), the request may be satisfied according to the locked bid. The transaction circuit 218 may generate two (or more) sets of instructions for two financial institutions 202. In particular, for executing a bid, the transaction circuit 218 may generate instruction(s) for the financial institution 202 associated with the sender 200 and instruction(s) for the financial institution 202 associated with the recipient.

The transaction circuit 218 may generate instructions to transfer funds from the sender's account to the bidder's account with the same financial institution 202. Additionally, the transaction circuit 218 may generate instructions to transfer funds from the bidder's account to the recipient's account with the same financial institution 202. Accordingly, funds are transferred from the sender to the bidder within one financial institution 202, and funds are transferred from the bidder to the recipient within another financial institution 202. Where a group bid is selected, the transaction circuit 218 may generate instruction to transfer funds from the sender's account to each of the bidders' account according to their individual bids, and from each of the bidders' accounts according to their individual bids to the recipient's account.

When funds are transferred, the transaction circuit 218 may generate a notification to communicate via the communications device 204 to all interested parties (e.g., the sender 200, the bidder(s) 212, and the recipient). The notification may notify each interested party of completion of the remittance through execution of the intrabank transfers.

According to the embodiments described herein, such transfers may be instantaneous (or near instantaneous). Such transfers are instantaneous or near instantaneous as a result of the transfers being intrabank transfers. Typically, where interbank transfers are initiated, such transfers may take a longer duration of time due to each institution verifying available funds and communicating amongst the institutions. Where an intrabank transfer is executed, such verification and communication is expedited since the individual institution has immediate access to the necessary account information.

It should be noted that, while described as being separate, in some instances, the request circuit 206, the bid circuit 210, and/or the transaction circuit 218 may be embodied as a single circuit that performs the functions described above. Accordingly, the present disclosure is not limited by such an arrangement. Such circuit(s) may be located anywhere, such as a warehouse, any of the financial institutions 202, or somewhere else. The circuit(s) may be communicably coupled with one another (and with other devices/components of the remittance computing system 112) through various communications devices. The communications devices may include wired and wireless communications devices. Where wireless, the communications devices may communicate via a communication protocol. The various GUIs described herein may be rendered on the user device(s) 110 by the user device(s) 110 receiving data (e.g., via a web portal or website, an application, or other interface) from the various circuit(s) described herein.

It is further noted that, while various GUIs are described with reference to FIG. 3-FIG. 7, the present disclosure is not limited to the particular GUIs shown. To the contrary, these GUIs may be modified according to various design and/or user needs.

Figure 8:
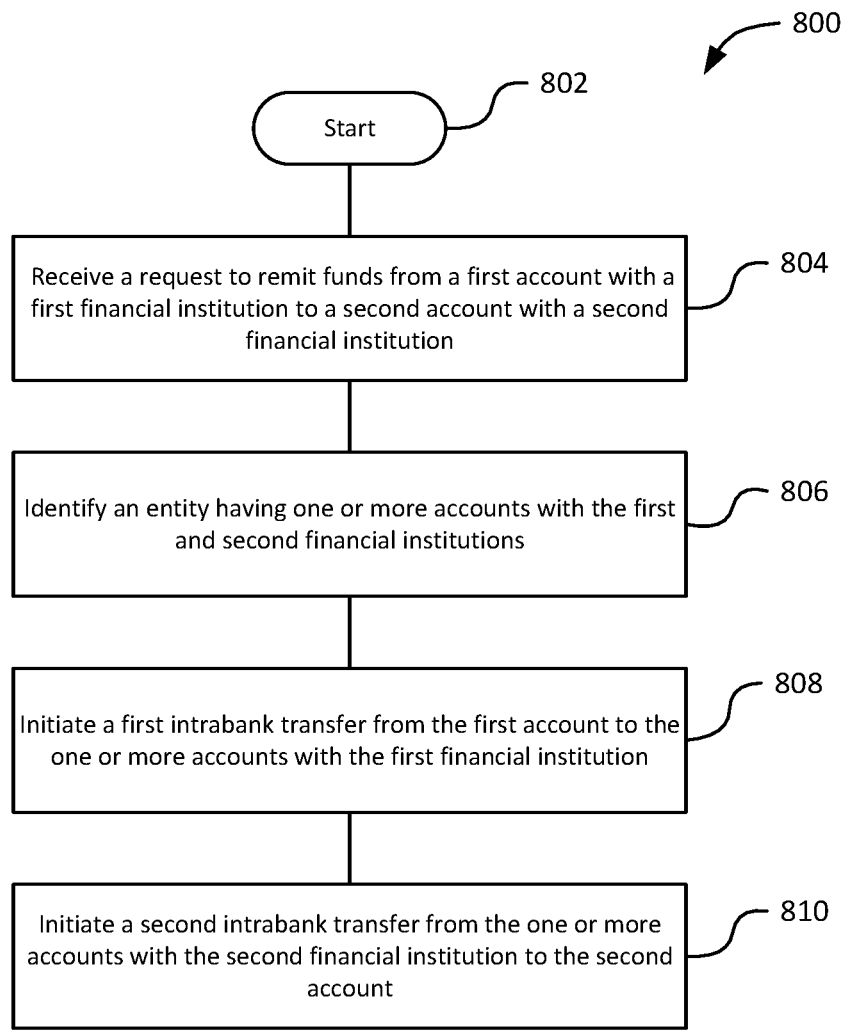
FIG. 8 shows a flow chart depicting an example method of using intrabank transfers for an international remittance, according to an exemplary embodiment.

Now that various aspects of the disclosed systems and components have been described, a method of using intrabank transfers for an international remittance will be described with reference to FIG. 8. The flow chart shown in FIG. 8 provides only one example of international remittances via intrabank transfers. Accordingly, the following disclosure should not be limited to each and every operation shown in FIG. 8. To the contrary, the method does not require each and every operation shown in FIG. 8. In some examples, the method may include additional operations. Further, the method does not need to be performed in the same chronological order shown in FIG. 8.

Referring to FIG. 8, shown is a flow chart depicting an example method 800 of using intrabank transfers for an international remittance, according to an exemplary embodiment. The method 800 may include a starting block 802.

At starting block 802, the method 800 may begin. The method 800 may begin when a sender 200 logs into or otherwise provides account information for submitting a request. The method 800 may begin when a sender 200 opens an application (or web portal or website) on their user device 110 for submitting a request. The method 800 may proceed to operation 804.

At operation 804, the request circuit 206 may receive a request to remit funds from a first account to a second account. The request circuit 206 may receive the request from a user device 110 associated with a first user (e.g., the sender 200). The first account may be an account held by the first user at a first financial institution 202. The second account may be an account held by a second user (e.g., a recipient) at a second financial institution 202.

In some embodiments, the method 800 may further include identifying an amount of funds to be remit from the first to second account. The amount of funds may be used for identifying eligible bidders 212, as will be discussed in greater detail below.

The method 800 may proceed to operation 806.

At operation 806, the bid circuit 210 may identify an entity having one or more accounts with the first and second financial institutions 202. In some embodiments, the entity is a third user (e.g., a single bidder) having a third account with the first institution and a fourth account with the second institution. In other embodiments, the entity may be a plurality of users (e.g., a plurality of bidders), each of which having respective accounts with the first institution and respective accounts with the second institution.

In some embodiments, at operation 806, the bid circuit 210 may identify the entity based on the amount of funds to be remit from the first to the second account. For instance, the bid circuit 210 may execute rules to identify the entity or entities having the one or more accounts with the first institution 202 and the one or more accounts with the second financial institution 202 and that the one or more accounts with the second institution 202 have the identified amount of funds to satisfy the request. Accordingly, the entity identified at operation 806 has the necessary accounts to satisfy the request, and has sufficient funds in their accounts with the second financial institution 202 to satisfy the request.

In some embodiments, following operation 806, the bid circuit 210 may receive a plurality of bids from at least some of the entities identified at operation 806. The request circuit 206 may generate, for instance, a GUI (such as GUI 700) for providing at least one of the plurality of bids received from the entities. The user may select (via the GUI 700) one of the bids. In embodiments such as these, the subsequent operations (e.g., operations 808-810) may be performed following receiving a selection of one of the bids.

The method 800 may proceed to operation 808.

At operation 808, the transaction circuit 218 may initiate a first intrabank transfer from the first account to the one or more accounts with the first financial institution 202. The transaction circuit 218 may generate instructions to communicate to the first financial institution 202. The transaction circuit 218 may communicate these instructions via the communications device 204. The first financial institution 202 may receive the instructions and transfer funds from the sender's account to the one or more accounts with the first financial institution 202 identified at operation 806. The method may proceed to operation 810.

At operation 810, the transaction circuit 218 may initiate a second intrabank transfer from the one or more accounts with the second financial institution 202 to the second account. The transaction circuit 218 may generate instructions to communicate to the second financial institution 202. The transaction circuit 218 may communicate these instructions via the communications device 204. The second financial institution 202 may receive the instructions and transfer funds from the one or more accounts with the second financial institution 202 identified at operation 806 to the second account.

In embodiments where the entity is the third user, the first and second intrabank transfers initiated at function blocks 808 and 810 may be a transfer of funds from the first account to the third account and a transfer of funds from the fourth account to the second account, respectively. In embodiments where the entity is a plurality of users (e.g., a plurality of bidders), the first intrabank transfer initiated at function block 808 may be a series of transfers of funds from first account to the each of the respective accounts with the first financial institution 202. Additionally, the second intrabank transfer initiated at function block 810 may be a series of transfers of funds from the each of the respective accounts with the second financial institution 202 to the second account.

From operation 810, the method 800 can end. The method 800 can end when the request from the sender 200 has been executed (e.g., all funds have been transferred so as to satisfy the request submitted by the sender 200).

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), a distributed ledger (e.g., a blockchain), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Ethereum, Ripple, Litecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A system for international remittances, the system comprising:
    a processing circuit including one or more processors and memory, the memory being structured to store instructions that, when executed, cause the processing circuit to:
        receive a request from a user device to remit funds from a first account to a second account, the first account being held with a first financial institution, and the second account being held with a second financial institution;
        access, via a first API communicably coupled to the first financial institution, first data corresponding to a plurality of users having a respective account with the first financial institution;
        access, via a second API communicably coupled to the second financial institution, second data corresponding to a plurality of users having a respective account with the second financial institution;
        identify, using the first data and the second data, a plurality of third users, based at least in part on the request from the user device, each third user having respective accounts at the first financial institution and the second financial institution;
        receive, from a plurality of respective user devices of the plurality of third users, a plurality of bids comprising portions of the request, wherein no bid satisfies an entirety of the request;
        responsive to determining that no bid satisfies an entirety of the request, identify a lowest bid of the plurality of bids from the plurality of third users, and the respective user device of the third user corresponding to the lowest bid;
        transmit a notification to the respective user device of the identified third user, the notification including a request to modify the lowest bid to satisfy the request;
        receive, from the respective user device of the identified third user of the plurality of third users, a modification of the lowest bid of the plurality of bids to generate a modified bid based on the notification;
        aggregate the modified bid with one or more of the plurality of bids to formulate a group bid from a subset of the plurality of third users, the group bid being sufficient to satisfy the entirety of the request;

initiate a first intrabank transfer to transfer funds from the first account to accounts of the subset of the plurality of third users at the first financial institution; and initiate a second intrabank transfer to transfer funds from accounts of the subset of the plurality of third users at the second financial institution to the second account.

2. The system of claim 1, wherein the first account is associated with a first user and the second account is associated with a second user.

3. The system of claim 1, wherein the first account is denominated in a first currency and the second account is denominated in a second currency.

4. The system of claim 1, wherein the modification of the lowest bid is received in response to the modification request transmitted to the respective user device of the identified third user.

5. The system of claim 1, wherein the processing circuit identifies, from the plurality of third users, a subset of users that have a respective account at both the first financial institution and the second financial institution and sufficient funds to satisfy the request.

6. The system of claim 1, wherein the instructions further cause the processing circuit to:

generate a signal to communicate to the user device that causes the user device to present a plurality of the group bids for fulfilling the request; and receive, from the user device, a selection of the group bid from the plurality of group bids presented on the user device.

7. The system of claim 1, wherein the instructions further cause the processing circuit to cause at least some of the plurality of respective user devices to render a graphical user interface (GUI) comprising at least one input field for inputting a bid and a real-time fee rate associated with a traditional remittance.

8. The system of claim 7, wherein the real-time fee rate is auto-populated with live data acquired via API interaction with a third party computing system.

9. A computer-implemented method comprising:

receiving, via a communications device, a request from a user device to remit funds from a first account to a second account, the first account being held with a first financial institution, and the second account being held with a second financial institution;

accessing, via a first API communicably coupled to the first financial institution, first data corresponding to a plurality of users having a respective account with the first financial institution;

accessing, via a second API communicably coupled to the second financial institution, second data corresponding to a plurality of users having a respective account with the second financial institution;

identifying, using the first data and the second data, a plurality of third users, based at least in part on the request from the user device, each third user having respective accounts at the first financial institution and the second financial institution;

receiving, via the communications device, from a plurality of respective user devices of the plurality of third users, a plurality of bids comprising portions of the request, wherein no bid satisfies an entirety of the request;

responsive to determining that no bid satisfies an entirety of the request, identifying a lowest bid of the plurality of bids from the plurality of third users, and the respective user device of the third user corresponding to the lowest bid;

transmitting, via the communications device, a notification to the respective user device of the identified third user, the notification including a request to modify the lowest bid to satisfy the request;

receiving, via the communications device, from the respective user device of the identified third user of the plurality of third users, a modification of the lowest bid of the plurality of bids to generate a modified bid based on the notification;

aggregating the modified bid with one or more of the plurality of bids to formulate a group bid from a subset of the plurality of third users, the group bid being sufficient to satisfy the entirety of the request;

initiating a first intrabank transfer to transfer funds from the first account to accounts of the subset of the plurality of third users at the first financial institution; and initiating a second intrabank transfer to transfer funds from accounts of the subset of the plurality of third users at the second financial institution to the second account.

10. The computer-implemented method of claim 9, wherein the first account is associated with a first user and the second account is associated with a second user.

11. The computer-implemented method of claim 9, wherein the first account is denominated in a first currency and the second account is denominated in a second currency.

12. The computer-implemented method of claim 9, wherein the modification of the lowest bid is received in response to the modification request transmitted to the respective user device of the identified third user.

13. The computer-implemented method of claim 9, further comprising identifying, from the plurality of third users, a subset of users that have a respective account at both the first financial institution and the second financial institution and sufficient funds to satisfy the request.

14. The computer-implemented method of claim 9, further comprising:

generating a signal to communicate to the user device that causes the user device to present a plurality of the group bids for fulfilling the request; and receiving, via the communications device, from the user device, a selection of the group bid from the plurality of group bids presented on the user device.

15. The computer-implemented method of claim 9, further comprising causing at least some of the plurality of respective user devices to render a graphical user interface (GUI) comprising at least one input field for inputting a bid and a real-time fee rate associated with a traditional remittance.

16. The computer-implemented method of claim 15, wherein the real-time fee rate is auto-populated with live data acquired via API interaction with a third party computing system.

17. A non-transitory computer readable medium storing instructions that, when executed by one or more processors, cause the one or more processors to:

receive a request from a user device to remit funds from a first account to a second account, the first account being held with a first financial institution, and the second account being held with a second financial institution;

access, via a first API communicably coupled to the first financial institution, first data corresponding to a plurality of users having a respective account with the first financial institution;

access, via a second API communicably coupled to the second financial institution, second data corresponding to a plurality of users having a respective account with the second financial institution;

identify, using the first data and the second data, a plurality of third users, based at least in part on the request from the user device, each third user having respective accounts at the first financial institution and the second financial institution;

receive, from a plurality of respective user devices of the plurality of third users, a plurality of bids comprising portions of the request, wherein no bid satisfies an entirety of the request;

responsive to determining that no bid satisfies an entirety of the request, identify a lowest bid of the plurality of bids from the plurality of third users, and the respective user device of the third user corresponding to the lowest bid;

transmit a notification to the respective user device of the identified third user, the notification including a request to modify the lowest bid to satisfy the request;

receive, from the respective user device of the identified third user of the plurality of third users, a modification of the lowest bid of the plurality of bids to generate a modified bid based on the notification;

aggregate the modified bid with one or more of the plurality of bids to formulate a group bid from a subset of the plurality of third users, the group bid being sufficient to satisfy the entirety of the request;

initiate a first intrabank transfer to transfer funds from the first account to accounts of the subset of the plurality of third users at the first financial institution; and initiate a second intrabank transfer to transfer funds from accounts of the subset of the plurality of third users at the second financial institution to the second account.

18. The non-transitory computer readable medium of claim 17, wherein the first account is associated with a first user and the second account is associated with a second user, and wherein the first account is denominated in a first currency and the second account is denominated in a second currency.

\* \* \* \* \*